US011423672B2

(12) United States Patent
Subramanian et al.

(10) Patent No.: US 11,423,672 B2
(45) Date of Patent: Aug. 23, 2022

(54) SYSTEM AND METHOD TO DETECT DRIVER INTENT AND EMPLOY SAFE DRIVING ACTIONS

(71) Applicant: DISH Network L.L.C., Englewood, CO (US)

(72) Inventors: Prakash Subramanian, Littleton, CO (US); Nicholas B. Newell, Centennial, CO (US); John C. Calef, III, Colorado Springs, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 25 days.

(21) Appl. No.: 16/530,903

(22) Filed: Aug. 2, 2019

(65) Prior Publication Data
US 2021/0034889 A1 Feb. 4, 2021

(51) Int. Cl.
G06V 20/59 (2022.01)
H04W 4/46 (2018.01)
G06T 7/20 (2017.01)
G06T 7/70 (2017.01)
G06F 3/14 (2006.01)
H04N 5/247 (2006.01)
G10L 15/22 (2006.01)
(Continued)

(52) U.S. Cl.
CPC ............. *G06V 20/597* (2022.01); *B60Q 9/00* (2013.01); *G06F 3/14* (2013.01); *G06T 7/20* (2013.01); *G06T 7/70* (2017.01); *G06V 20/56* (2022.01); *G06V 40/28* (2022.01); *G08G 1/096791* (2013.01); *G10L 15/1815* (2013.01); *G10L 15/22* (2013.01); *H04N 5/247* (2013.01); *H04W 4/46* (2018.02); *G05D 1/0276* (2013.01); *G05D 2201/0213* (2013.01); *G06T 2207/30196* (2013.01); *G06T 2207/30236* (2013.01); *G06T 2207/30264* (2013.01); *G06T 2207/30268* (2013.01); *G06V 2201/08* (2022.01)

(58) Field of Classification Search
CPC ............................... H04W 4/46; G06V 20/597
See application file for complete search history.

(56) References Cited

U.S. PATENT DOCUMENTS 10,035,514 B1 * 7/2018 Lambert ............... B60W 40/09
10,466,717 B1 * 11/2019 Su ......................... G07C 5/008
(Continued)

Primary Examiner — Brian T Pendleton
Assistant Examiner — Frank Johnson
(74) Attorney, Agent, or Firm — Seed IP Law Group LLP

(57) ABSTRACT

Embodiments are directed towards the interpretation of driver intent and communication of that intent with autonomous vehicles at a traffic intersection. A computing device that sits on the dashboard of a vehicle includes at least one camera, an output device, and circuitry. The computing device captures first images of the driver in the vehicle and second images of the traffic intersection. The computing device identifies another vehicle at or approaching the intersection based on an analysis of the second images. The computing device determines an attention direction and hand movement of the driver based on an analysis of the first images to determine a driving intent of the driver. The computing device provides information to the other vehicle indicating the driving intent of the driver. The computing device may also obtain the driving intent of the other vehicle and provide information to the driver indicating the other vehicle's intent.

23 Claims, 5 Drawing Sheets

(51) Int. Cl.
  *G10L 15/18* (2013.01)
  *G08G 1/0967* (2006.01)
  *B60Q 9/00* (2006.01)
  *G06V 20/56* (2022.01)
  *G06V 40/20* (2022.01)
  *G05D 1/02* (2020.01)

(56) References Cited

U.S. PATENT DOCUMENTS

| | | | |
|---|---|---|---|
| 2002/0019703 A1* | 2/2002 | Levine | B60Q 1/346 |
| | | | 701/301 |
| 2007/0252723 A1* | 11/2007 | Boss | G08G 1/162 |
| | | | 340/902 |
| 2014/0200782 A1* | 7/2014 | Goudy | G08G 1/166 |
| | | | 701/70 |
| 2015/0235485 A1* | 8/2015 | Nemat-Nasser | B60W 40/09 |
| | | | 701/1 |
| 2017/0024937 A1* | 1/2017 | Ramesh | B60L 58/12 |
| 2017/0131719 A1* | 5/2017 | Micks | G06V 20/56 |
| 2017/0174261 A1* | 6/2017 | Micks | B60W 30/00 |
| 2017/0193384 A1* | 7/2017 | Mudalige | G08G 1/166 |
| 2018/0053414 A1* | 2/2018 | Qin | G08G 1/0112 |
| 2018/0189581 A1* | 7/2018 | Turcot | G06K 9/4628 |
| 2018/0197050 A1* | 7/2018 | Deutsch | G06K 9/6224 |
| 2018/0267076 A1* | 9/2018 | Shou | B60Q 9/00 |
| 2019/0088135 A1* | 3/2019 | Do | G08G 1/015 |
| 2019/0206253 A1* | 7/2019 | Amano | G08G 1/096791 |
| 2019/0351918 A1* | 11/2019 | Maeng | B60W 50/14 |
| 2020/0191596 A1* | 6/2020 | Kim | G01C 21/3679 |
| 2020/0410850 A1* | 12/2020 | Liu | B60Q 1/503 |
| 2021/0043077 A1* | 2/2021 | Kobayashi | B60W 40/09 |
| 2021/0094568 A1* | 4/2021 | Nakanishi | B60W 60/001 |
| 2021/0289330 A1* | 9/2021 | Tian | G06K 9/00845 |

* cited by examiner

SYSTEM AND METHOD TO DETECT DRIVER INTENT AND EMPLOY SAFE DRIVING ACTIONS

TECHNICAL FIELD

The present disclosure relates generally to autonomous vehicle communication and, more particularly, to determining the intent of a driver at a traffic intersection and communicating that intent to other vehicles or drivers at the traffic intersection.

BACKGROUND

Description of the Related Art

Autonomous vehicles, or self-driving vehicles, are starting to make their way onto public streets as sensor and image processing technologies improve. Autonomous vehicles generally employ an array of different cameras and sensors to detect the world around them and what other vehicles are doing. Autonomous vehicles use the information from these sensors and various rules, based on traffic laws and human reactions, to determine how to proceed or react to movement by other vehicles. Therefore, as the use of autonomous vehicles continues to increase, so too does the likelihood of interactions between autonomous vehicles and non-autonomous vehicles, especially at intersections. When two vehicles approach a traffic intersection, one vehicle typically has the right-of-way and the other is to yield to the vehicle that has the right-of-way. If both vehicles are driven by humans, the humans can interact or observe subtle information from each other to determine how to proceed at the intersection. If one of the vehicles, however, is an autonomous vehicle then this interaction is greatly diminished, which can result in the autonomous vehicle and the human at a standstill as they both try to figure out what the other vehicle is doing. It is with respect to these and other considerations that the embodiments described herein have been made.

BRIEF SUMMARY

Briefly described, embodiments are directed toward systems, methods, and devices that enable the interaction between human drivers and autonomous vehicles at traffic intersections. When two vehicles approach a traffic intersection, a human driver of a first vehicle may gesture to a second vehicle to indicate that the driver will wait for the second vehicle to proceed through the intersection, or that the driver is going to proceed and the second vehicle should wait. Embodiments described herein capture images of the driver as the driver approaches or is at a traffic intersection to determine the driver's driving intent. The driving intent is then provided to second vehicle (or other vehicles) at the traffic intersection, whether by displaying a visual indicator (e.g., a red or green light) or by transmitting a wireless communication message.

This interaction allows the second vehicle (whether an autonomous vehicle or another vehicle with a driver) to make an informed decision as to how to proceed through the traffic intersection based on what the driver of the first vehicle is doing. Conversely, in some embodiments, the intent of the second vehicle is obtained and presented to the driver of the first vehicle. In this way, the driver of the first vehicle can understand what the second vehicle (whether an autonomous vehicle or another vehicle with a driver) is doing and make an informed decision for proceeding through the traffic intersection.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or"

operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As used herein, the term "traffic intersection" refers to a location where two or more roads, lanes, alleys, or vehicle passageways may converge or intersect such that one vehicle may collide with another vehicle if one vehicle does not yield to the other. Examples of traffic intersections include, but are not limited to, street intersections, roundabouts, parking lots, highway merging ramps, driveway entrances, etc.

As used herein, the term "vehicle" refers to a device that travels on roads, lanes, alleys, or other passageways to transport people or goods. Examples of vehicles include, but are not limited to, cars, trucks, tractor trailers, other automobiles, boats, buses, etc.

Figure 1:
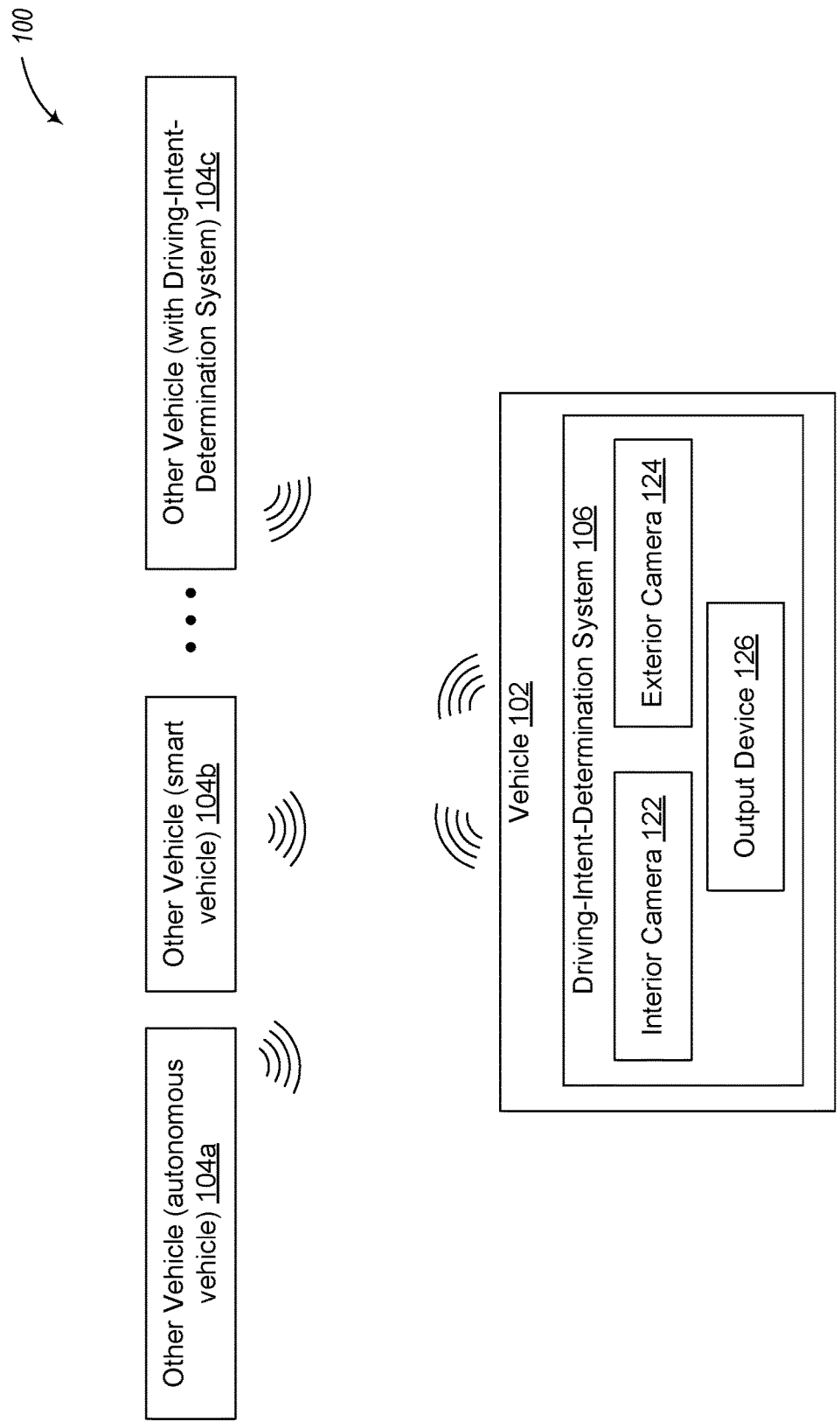
FIG. 1 illustrates a context diagram of an environment for determining driver intent and communicating that intent to other vehicles in accordance with embodiments described herein.

FIG. 1 illustrates a context diagram of an environment 100 for determining driver intent and communicating that intent to other vehicles in accordance with embodiments described herein. Environment 100 includes vehicle 102 and one or more other vehicles 104a-104c.

Vehicle 102 is a vehicle that includes a driving-intent-determination system 106. The driving-intent-determination system 106 utilizes exterior camera 124 to obtain images of an area outside of the vehicle 102 as the vehicle 102 approaches or is at a traffic intersection. These exterior images are analyzed by the driving-intent-determination system 106 to identify characteristics of the traffic intersection, identify the other vehicles 104a-104c at the traffic intersection, etc.

The driving-intent-determination system 106 utilizes interior camera 122 to capture images of the driver of the vehicle 102. These interior images are analyzed by the driving-intent-determination system 106 to identify the driver's attention direction and hand movement and gestures. The driver's attention direction, hand movement and gestures, and traffic intersection characteristics is utilized by the driving-intent-determination system 106 to determine a driving intent of the driver of the vehicle 102 at a traffic intersection.

Once the driving intent of the driver is determined, the driving-intent-determination system 106 provides information regarding the driving intent to the other vehicles 104a-104c via an output device 126. The output device 126 may include visual display devices to present visual information indicating the driving intent, or it may include wireless communication transmitters to transmit wireless messages with the driving intent information to the other vehicles 104a-104c (e.g., via broadcast transmissions or point-to-point transmission). In other embodiments, the driving-intent-determination system 106 obtains driving intent information from the other vehicles 104a-104c and presents that driving intent to the driver of the vehicle 102 via the output device 126.

The other vehicles 104a-104c may include autonomous vehicles 104a, smart vehicles 104b, or other vehicles with driving-intent-determination system 104c that can send or receive wireless communication messages. Autonomous vehicles 104a include self-driving vehicles or other vehicles whose movement is being at least partially controlled by a computer. Smart vehicles 104b are vehicles driven by a person, but include computing components to communicate with other vehicles. The other vehicles 104c are under control of a human and are non-smart vehicles and non-autonomous vehicles, but include a driving-intent-determination system. In some embodiments, the other vehicles 104a-104c provide or transmit the driving intent of the other vehicle or its corresponding driver to the vehicle 102, as described herein. Although not illustrated, the other vehicles may also include human operated vehicles that do not have a driving-intent-determination system, especially in situations where the driving-intent-determination system 106 displays a visual indicator of the driver's intent via output device 126.

Figure 2:
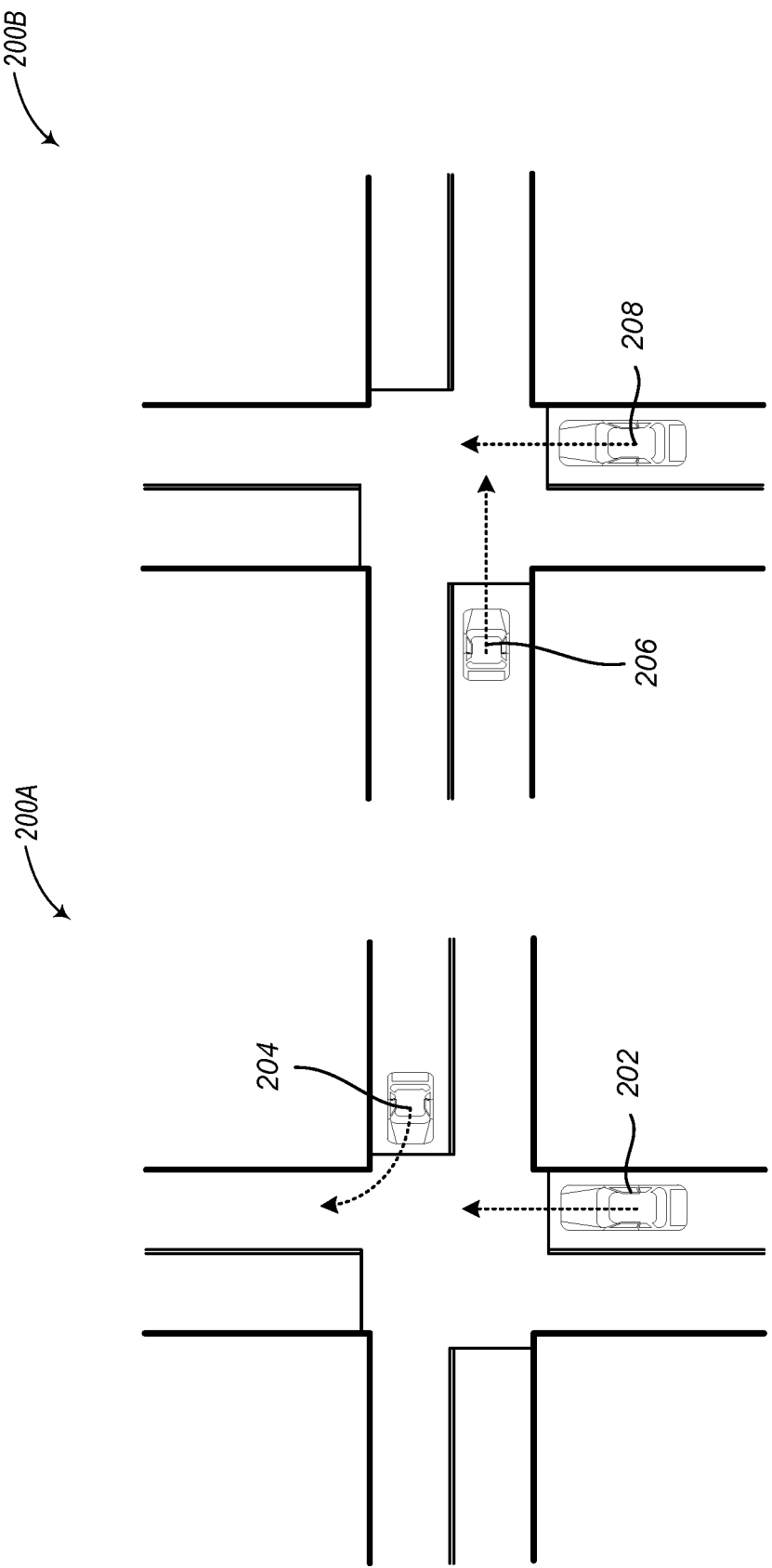
FIGS. 2A and 2B are example illustrations of driving scenarios where embodiments described herein may be utilized.

FIGS. 2A and 2B are example illustrations of driving scenarios where embodiments described herein may be utilized. FIG. 2A illustrates a traffic intersection 200A where a first vehicle 202 has arrived at the traffic intersection 200A at the same time as a second vehicle 204. In this example, the first vehicle 202 is an embodiment of vehicle 102 in FIG. 1 with a driving-intent-determination system, and the second vehicle 204 is an embodiment of vehicle 104 in FIG. 1.

The first vehicle 202 is intending to proceed straight through the traffic intersection 200A. And the second vehicle 204 is intending to turn right in front of the first vehicle 202. Even if the first vehicle 202 arrived at the traffic intersection 200A first and has the right-of-way, the driver of the first vehicle 202 may wave the second vehicle 204 to proceed first. If the second vehicle 204 is an autonomous vehicle and it applies traffic laws to determine which vehicle is to proceed first, it may wait for the first vehicle 202 to proceed through the traffic intersection 200A, even though the driver of the first vehicle 202 is indicating that the driver is waiting for the second vehicle 204. By employing embodiments described herein, a driving-intent-determination system in the first vehicle 202 captures images of the driver's wave and determines that the driver intents to wait. The driving-intent-determination system provides this driving intent to the second vehicle 204. The second vehicle 204 can then proceed through the traffic intersection 200A, followed by the first vehicle 202.

FIG. 2B is similar to FIG. 2A and illustrates a traffic intersection 200B where a first vehicle 208 has arrived at the traffic intersection 200B at the same time as a second vehicle 206. In this example, the first vehicle 208 is an embodiment of vehicle 102 in FIG. 1 with a driving-intent-determination system, and the second vehicle 206 is an embodiment of vehicle 104 in FIG. 1.

The first vehicle 208 is intending to proceed straight through the traffic intersection 200B. And the second vehicle 206 is intending to proceed straight through the traffic intersection in front of the first vehicle 208. In this example, the second vehicle 206 may be an autonomous vehicle and determine that the first vehicle 208 is to proceed first. The second vehicle 206 may begin transmitting a wireless message to tell the first vehicle 208 to proceed first. The first vehicle 208 includes a driving-intent-determination system that captures images of the traffic intersection 200B and analyzes the images to identify the second vehicle 206 as an autonomous vehicle. In response to this determination, the first vehicle 208 can obtain the driving intent being transmitted by the second vehicle 206 and provide an indication of this intent to the driver of the first vehicle 208. The first vehicle 208 can then proceed through the traffic intersection 200B, followed by the second vehicle 206.

The operation of certain aspects will now be described with respect to FIGS. 3 and 4. In at least one of various embodiments, processes 300 and 400 described in conjunction with FIGS. 3 and 4, respectively, may be implemented by one or more processors or executed via circuitry on one or more computing devices, such as driving-intent-determination system 106 in FIG. 1.

Figure 3:
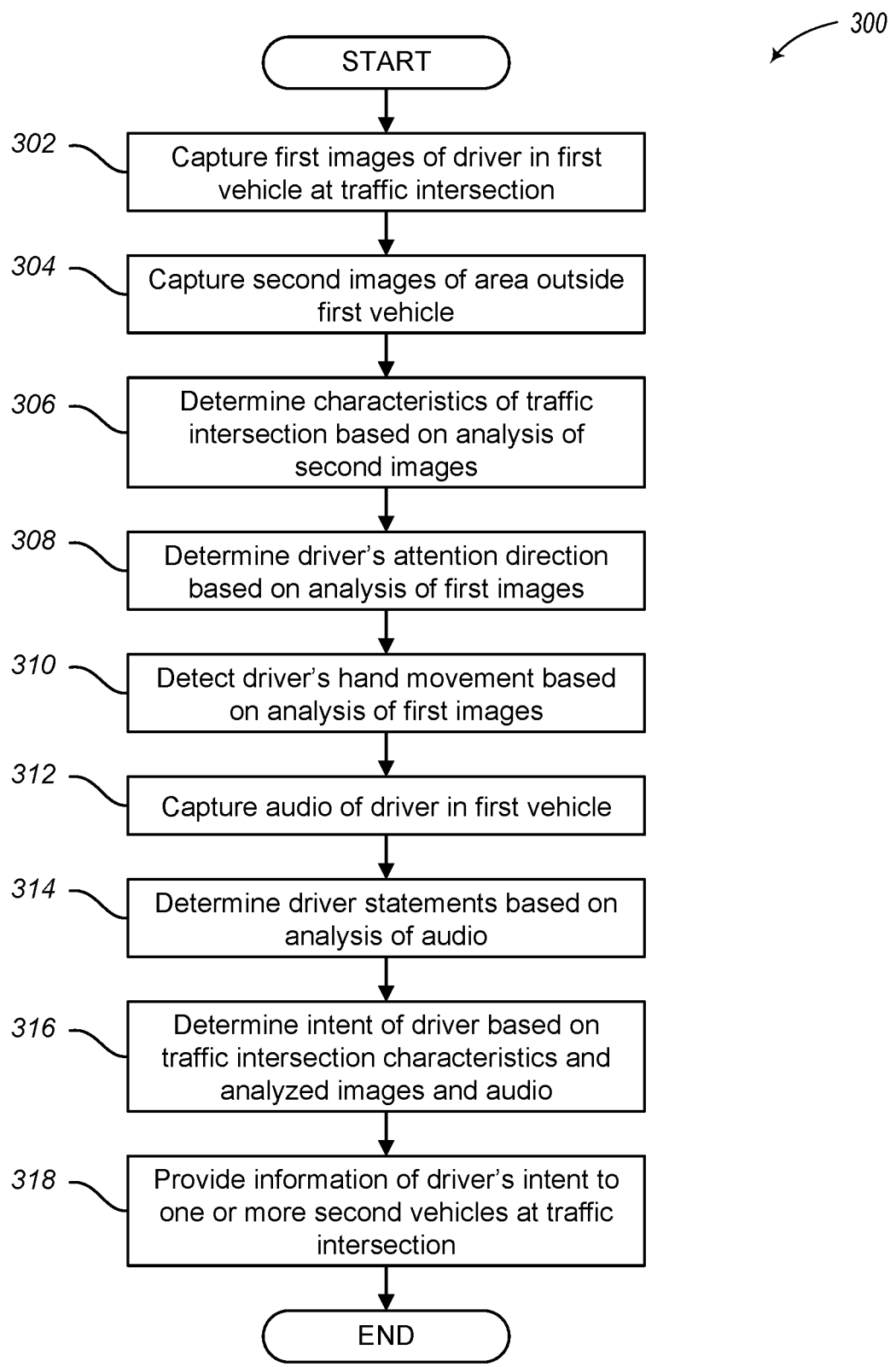
FIG. 3 illustrates a logical flow diagram showing one embodiment of a process for determining a driver's intention at a traffic intersection based on images and audio of the driver and communicating that intention to other vehicles at the traffic intersection in accordance with embodiments described herein.

FIG. 3 illustrates a logical flow diagram showing one embodiment of a process for determining a driver's intention at a traffic intersection based on images and audio of the driver and communicating that intention to other vehicles at the traffic intersection in accordance with embodiments described herein. Process 300 begins, after a start block, at block 302, where one or more first images of a driver in a first vehicle at a traffic intersection are captured. Utilization of "first" when referring to a "first vehicle" is used to distinguish one vehicle from another vehicle and does not indicate an order in which vehicles approach or arrive at a traffic intersection.

As described herein, one or more cameras may be facing the driver to capture the first images of the driver's eye position and movement, the driver's head position and movement, or hand gestures made by the driver. In some embodiments, the captured first images may include one or more image frames captured in response to the vehicle approaching a traffic intersection. In other embodiments, the captured first images may include a plurality of image frames that are captured in real time independent of the actual location of the vehicle.

Process 300 proceeds to block 304, where second images of an area outside of a first vehicle are captured. In various embodiments, these second images may be captured from a camera positioned to capture images in front of the first vehicle, such as the roadway the first vehicle is operating on. In other embodiments, these second images may be captured from a camera positioned to capture images behind or to the side of the vehicle, such as to capture an area where the vehicle may backup towards.

Process 300 continues at block 306, where one or more characteristics of the traffic intersection are determined. These characteristics may include, but are not limited to, whether the traffic intersection is a parking lot, a roundabout, or a normal intersection; whether there is a stop sign or traffic signal at the traffic intersection; the number of lanes and their turning designation (e.g., left turn only, right turn only, no turn on red, thru traffic only, etc.); or other information regarding the features of the traffic intersection. In various embodiments, one or more image processing techniques, artificial neural networks, or other learning algorithms may be utilized to analyze the exterior second images to identify known or defined characteristics. In various embodiments, one or more timing or distance thresholds may be used to determine when the first vehicle arrives at the traffic intersection.

In various embodiments, the characteristics of the traffic intersection may be determined or confirmed using other third-party information instead of or in addition to the analysis of the exterior images. For example, in some embodiments, a third-party map service may be queried using a GPS location of the vehicle for the characteristics of the traffic intersection. In at least one non-limiting example, the third-party map service may store information indicating which intersections are roundabouts or the number of turning lanes at the traffic intersection. This additional information can be used to further improve the determination of the one or more characteristics of the traffic intersection.

In yet other embodiments, information received from other vehicles approaching or at the traffic intersection may be used to further determine or confirm the characteristics of the traffic intersection. For example, as smart vehicle approach a traffic intersection they may be transmitting their GPS location and a unique identifier (and possibly other information, including current speed, current breaking, turn signal state, etc.). The driving-intent-determination system can utilize this information to determine a number of spokes of the traffic intersection, how many vehicles are at the traffic intersection, whether the traffic intersection is a roundabout, etc., which further improves the determination of the traffic intersection characteristics.

Process 300 proceeds to block 308, where the driver's attention direction is determined. In various embodiments, the captured first images are analyzed to identify where the driver is looking. In some embodiments, one or more image processing techniques are employed to identify a position of the driver's eyes relative to the driver's head, as well as a position of the driver's head relative to the front of the vehicle (which may be determined based on the driver's head position relative to the camera that captured the images of the driver). Moreover, the driver's eye movement or head movement may be determined by determining and comparing the driver's eye position or head position across multiple images over time. Collectively, the driver's eye position and movement or the driver's head position and movement, or some combination thereof indicate a general direction or area where the driver is looking, which may be referred to as the driver's attention direction.

As an example, the driving-intent-determination system analyzes the driver's eye position and movement, as well as the driver's head position and movement, to determine if the driver is looking at a particular second vehicle at the traffic intersection, at a pedestrian walking near the traffic intersection, at the head unit in the first vehicle, at a rear-view mirror, etc.

Process 300 continues at block 310, where the driver's hand movement is detected. In various embodiments, the captured first images are analyzed to identify if and how the driver is moving his or her hands. In some embodiments, one or more image processing techniques are employed to identify a position and movement of the driver's hand or arm, or a combination thereof. For example, one or more artificial neural networks or learning algorithms may be utilized to detect gestures or hand movement in one image or across multiple images. In other embodiments, known hand movements may be compared to the driver's hand position in one or more images to detect the driver's current hand movement.

Process 300 proceeds next to block 312, where audio of the driver or interior of the first vehicle is captured when the first vehicle is at or approaching the traffic intersection (e.g., within a threshold distance or travel time from the traffic intersection). In various embodiments, one or more microphones within the first vehicle may be utilized to capture audio of the driver.

Process 300 continues next at block 314, where one or more statements of the driver are determined based on an analysis of the captured audio. These statements may be utilized to determine if the driver is talking to a second vehicle or its driver. For example, the driver may be verbally telling a second vehicle at the traffic intersection to proceed through the traffic intersection, even though the second vehicle cannot hear the driver. In various embodiments, the audio is analyzed to identify the words spoken by the driver of the first vehicle.

In some embodiments, other audio in the vehicle may also be identified. For example, the "clicking" sound of an activated turn signal may also be detected to indicate that the driver is intending to turn at the traffic intersection, rather than drive straight through the traffic intersection.

Process 300 proceeds to block 316, where the intent of the driver is determined based on the traffic intersection characteristics and the analyzed images and audio. This driving intent is the driving intent of the first vehicle on whether it is going to proceed through the traffic intersection or whether it will wait for a second vehicle to proceed through the traffic intersection. As used herein, proceeding through the traffic intersection includes any interaction of a vehicle with the traffic intersection, including turning left through the intersection, turning right through the intersection, proceeding straight through the intersection, etc. Moreover, the driving intent may indicate that the intent of the driver is unknown. In various embodiments, a confidence level may be provided to the driving intent, which may be based on the combination of analyzed images and audio.

In various embodiments, the driver's attention direction determined at block 304 is utilized to determine if the driver is intending to communicate with a particular second vehicle at the traffic intersection. For example, if the driver is looking to the left, and there is a second vehicle to the left of the first vehicle (e.g., as determined based on an analysis of images of the traffic intersection), then the driver may be intending to communicate with the second vehicle. Conversely, if the driver is looking at the vehicle head unit, then the driver may not be communicating with the second vehicle.

The driver's hand movements detected at block 306 are compared to known hand movements or gestures to determine if and how the driver is intending to communicate with the second vehicle at the traffic intersection. Such hand movement may be a hand-waving gesture indicating that the second vehicle (e.g., another vehicle the driver of the first vehicle is looking at) should proceed through the traffic intersection. As another example, the gesture may be a pointing gesture indicating that the direction that the driver of the first vehicle intends to travel. In some embodiments, a database of known hand movements and the corresponding driver intent is stored for comparison and matching with the detected hand movements.

In various embodiments, the audio of the driver captured at block 308 may be analyzed to determine the driver's intent. In some embodiments, the audio may be compared to a known set of words or verbal commands that have known corresponding driver intent. If there is a match with the known set of words, then the driver's verbal intent can be obtained based on a known intent that corresponds to the matched words. For example, the driver may say "you can go," which indicates that the driver is going to wait for the second vehicle to proceed through the traffic intersection. Alternative, the driver may say "it is my turn" to indicate that the driver is not going to wait for the second vehicle.

In various embodiments, a combination of the traffic intersection characteristics, the driver's attention direction, the driver's hand movement, and the driver's statements can be utilized to determine the first vehicle's driver's intent at the traffic intersection. For example, even if the user is looking at the head unit, the driver may be screaming for the second vehicle to "go already." In this example, the driver's statements may override the driver's attention direction. As another example, if the traffic intersection includes a thru lane and a right-turn-only lane and the second vehicle is in the thru lane, then the driver's intended communication may be directed at the second vehicle. But if the second vehicle is in the right-turn-only lane, then the driver's intent may not be directed at the second vehicle.

In some embodiments, the user or an administrator may assign one or more weights or thresholds for different types of driver intent. For example, the audio intent may be weighted higher than the driver's hand gestures. Moreover, the intent may be further emphasized if the driver is looking at a particular second vehicle at the traffic intersection. As another example, different traffic intersection characteristics may be weighted based on the complexity or features of the traffic intersection.

Process 300 continues at block 318, where information of the driver's intent is provided to one or more second vehicles at the traffic intersection. As mentioned above, the driver's intent may be that the driver is intending to proceed through the traffic intersection, the driver is waiting, or the driver's intent is unknown.

In some embodiments, a display device within the first vehicle is utilized to present a visual representation of the information indicating the driver's intent. For example, a green light may be illuminated to indicate that the second vehicle can proceed and the driver of the first vehicle will wait or a red light may be illuminated to indicate that the second vehicle is to wait for the first vehicle to proceed through the traffic intersection. As another example, the display device may present words or symbols that can be displayed to the second vehicles with information indicating the intent of the first vehicle.

In other embodiments, a wireless communication message is transmitted from the driving-intent-determination system with the driver's intent information. In some embodiments, the wireless communication message may be transmitted via a suitable short-length radio transmission protocol. In at least one embodiment, the wireless communication message is broadcast without a specific computing device destination. In this way, any second vehicle at the traffic intersection that can receive the same short-length radio transmission protocol can receive the wireless communication message having the driver's intent information. In other embodiments, the wireless communication message is transmitted to a specific second vehicle at the traffic intersection via a point-to-point wireless communication protocol. In some embodiments, the driving-intent-determination system and the second vehicles at the traffic intersection may initially broadcast identification information such that the driving-intent-determination system and the second vehicles can communicate driving intent with particular vehicles. The second vehicle at the traffic intersection may be a smart vehicle, an autonomous vehicle, or even another driving-intent-determination system positioned in the second vehicle.

The second vehicle that receives the transmitted message can then use the received information to perform actions. For example, if the message is received by another driving-intent-determination system in the second vehicle then the other driving-intent-determination system can display or present the driving intention of the first driver of the first vehicle to a second driver of the second vehicle. Similarly, if the message is received by a smart vehicle, then the smart vehicle can display or present the driving intention to a second driver of the smart vehicle. If the message is received by an autonomous vehicle, then the autonomous vehicle can proceed through the traffic intersection or wait as indicated by the driving intention identified in the information in the transmitted message.

After block 318, process 300 terminates or returns to a calling process to perform other actions.

In some embodiments, process 300 may loop (not illustrated) to block 302 to continue to capture images of the driver in the vehicle and the area outside the vehicle, determine the driver's intent and provide information on the driver's intent to other vehicles. This process may continually analyze images of the driver or it may analyze images of the driver when the vehicle approaches or arrives at a traffic intersection. Moreover, although embodiments described above utilize both images and audio to determine the driver's intent, embodiments are not so limited. In other embodiments, only the images may be analyzed to determine the driver's intent and blocks 312 and 314 may be optional and may not be performed, and process 300 may proceed from block 310 to block 316. In yet other embodiments, only the audio may be analyzed to determine the driver's intent.

Embodiments described above analyze images and audio to determine the driving intent of the driver. In other embodiments, additional information or environmental factors can also be used to determine the driving intent, such as a smoke level in the vehicle, presence of alcohol smell in vehicle or a blood alcohol level of the driver (e.g., via a breathalyzer device), ambient noise inside the vehicle (e.g., music, cell phone distractions, talking passengers, etc.), ambient noise outside the vehicle (e.g., emergency sirens, vehicle noise, pedestrian noise, etc.), a number passengers inside the vehicle, presence of a cell phone inside the vehicle, headphones being worn by the driver, etc. One or more of these additional environmental factors can be used alone or in addition to the hand movement, head movement, or eye movement to determine the driving intent of the driver.

Moreover, in some embodiments, the intent of the driver or other information associated with the vehicle may be provided to other entities. For example, in some embodiments, the driving intent may indicate that the driver is going to wait, but additional sensors collect information that suggests that the driver proceeded through the traffic intersection anyways (e.g., an accelerometer that captures driving movement within a threshold time from when the driving intent was determined). This type of behavior may indicate that the driver is driving aggressively or erratically, especially if repeated over a short timeframe. If the driver repeats this aggressive driving at a select number of traffic intersections within a threshold amount of time, then a second message may be transmitted via a cellular network to the proper authorities to indicate that the driver is driving in an aggressive or erratic manner. As another example, where a blood alcohol level of the driver is determined and is above a threshold amount, a second message may be transmitted via the cellular network to the proper authorities indicating that the driver may be operating the vehicle impaired. Accordingly, in various embodiments, the vehicle may transmit or communicate special information about illegal or possibly illegal activity inside or associated with the vehicle to the authorities.

Although embodiments are described herein may suggest that the traffic intersection is a road intersection, embodiments are not so limited. In other embodiments, the traffic intersection may be a parking lot or other physical location where vehicles may intersect one another such that a human can communicate with another vehicle. By employing embodiments described herein, images of the driver can be used to determine the driving intent of the driver such that other vehicles are notified of the driving intent. For example, if the vehicle is positioned in a parking space and the driver begins to turns his head to check his mirrors or to look behind him, then the driver may be intending to exit the parking space and enter the aisle of the parking lot. With this determined driving intent, the driving-intent-determination system can notify other driving-intent-determination systems, smart vehicles, or autonomous vehicles that are nearby that the vehicle is about to or has started to exit the parking space.

In various embodiments, the driver may be enabled to define or record actions by the driver to indicate specific diving intentions. For example, the driver can record images of the driver holding a "thumbs up" and indicate that this gesture indicates that the driver intends that the second vehicle is to proceed through the traffic intersection. The system can then use this stored action to determine the driving intent at block 316.

In other embodiments, historical data can be analyzed and processed to better predict the driver's intent, such as by learning the driver's intent depending on the time of day, whether there are other people in the vehicle, etc. In some other embodiments, one or more other sensors may be used to determine how the driver of the first vehicle acted after the driving intent is provided to the second vehicle. For example, an accelerometer can be utilized to determine if the driver proceeded through the intersection in accordance with the determined driving intent. This information can be utilized to provide additional data points that indicate a confidence level of future determinations of driving intent. For example, if the driver waved at the second vehicle but immediately proceeded through the traffic intersection, then a future confidence level of a "wave" indicating that the driver intends to wait may be lowered.

Figure 4:
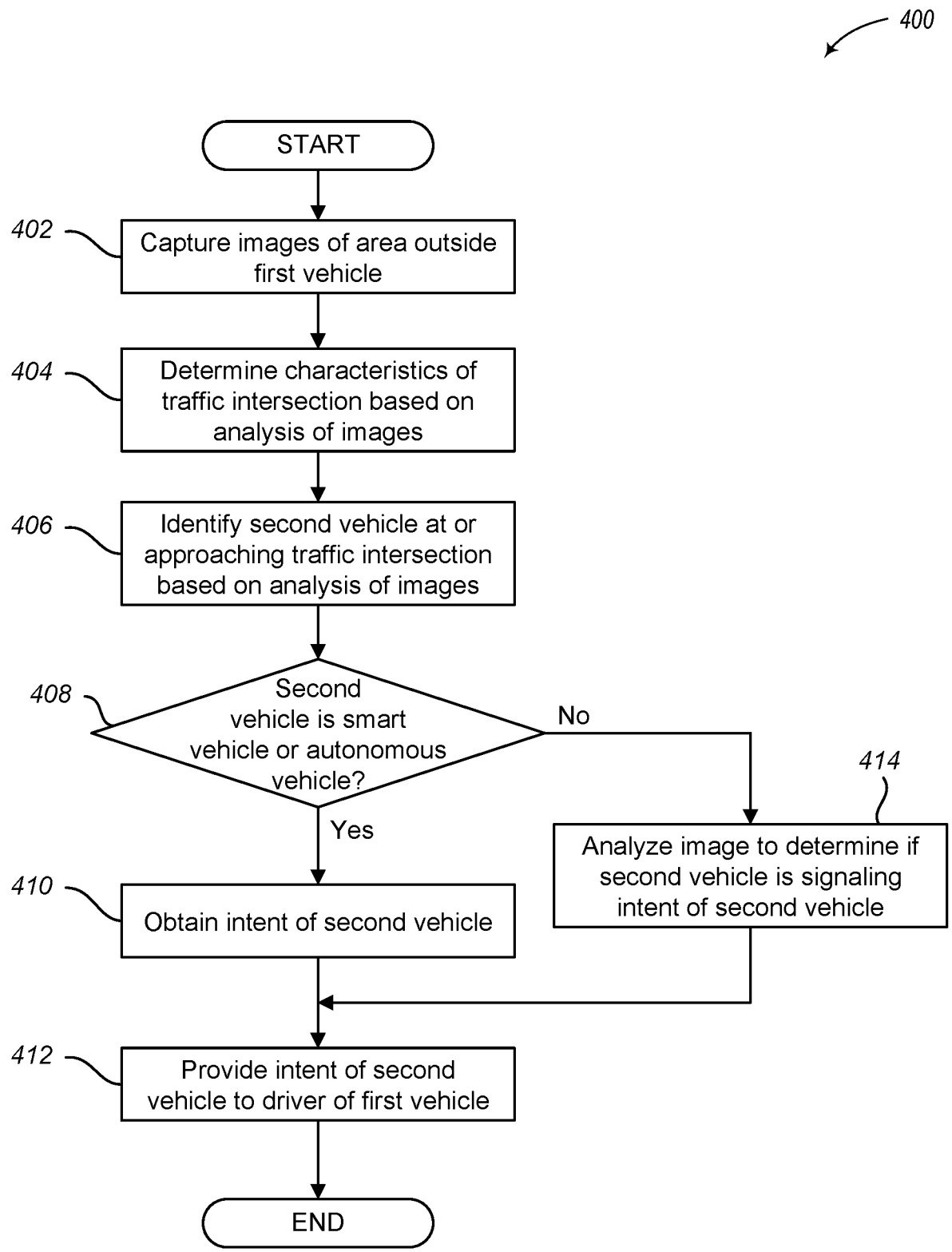
FIG. 4 illustrates a logical flow diagram showing one embodiment of a process for determining a driving intention of another vehicle at a traffic intersection and presenting that intention to the driver in accordance with embodiments described herein.

FIG. 4 illustrates a logical flow diagram showing one embodiment of a process for determining a driving intention of another vehicle at a traffic intersection and presenting that intention to the driver in accordance with embodiments described herein. Process 400 begins, after a start block, at block 402, where images of an area outside of a first vehicle are captured. In various embodiments, block 402 may employ embodiments similar to block 304 in FIG. 3 to capture external images.

Process 400 proceeds to block 404, where one or more characteristics of the traffic intersection are determined. In various embodiments, block 404 may employ embodiments similar to block 306 in FIG. 3 to determine traffic intersection characteristics.

Process 400 continues at block 406, where a second vehicle at or approaching the traffic intersection is identified. In various embodiments, the captured images are analyzed using one or more image processing techniques to identify a make and model of the vehicle. Although embodiments described herein imply use by cars, trucks, or other automobiles, embodiments are not so limited. For example, embodiments described herein may be utilized to determine the intent of a person driving a boat in a marina and provide that intent to other boats.

Process 400 proceeds next at decision block 408, where a determination is made whether the second vehicle is a smart vehicle or autonomous vehicle. In some embodiments, a list of known smart car or autonomous makes and models may be maintained. If the identified make and model are in the known list, then the second vehicle is a smart vehicle or autonomous vehicle. In some embodiments, the second vehicle may be considered a smart vehicle for purposes of obtaining driver intent if the second vehicle includes a driving-intent-determination system itself that transmits wireless communication messages having the second vehicle's driver's driving intent. If the second vehicle is a smart vehicle or autonomous vehicle, process 400 flows to block 410; otherwise, process 400 flows to block 414.

At block 410, the first vehicle obtains the intent of the second vehicle. In some embodiments, the smart vehicle or autonomous vehicle (or even a driving-intent-determination system in the second vehicle) is transmitting its own driving intent (e.g., via broadcast transmission or point-to-point transmissions). Similar to the driving intent determined at block 316 in FIG. 3, the driving intent of the second vehicle may indicate whether the second vehicle is proceeding through the traffic intersection or if the second vehicle is waiting for the first vehicle to proceed through the intersection. In some embodiments, the intent of the second vehicle is obtained by receiving a wireless communication message that includes information regarding the driving intent of the second vehicle. After block 410, process 400 proceeds to block 412.

If, at decision block 408, the second vehicle is not a smart vehicle or autonomous vehicle, process 400 flows from decision block 408 to block 414. At block 414, the images captured at block 402 are analyzed to determine if the second vehicle is signaling intent of the second vehicle. For example, the second vehicle may have a turn signal engaged to indicate that the second vehicle is turning. In other embodiments, the second vehicle may include a driving-intent-determination system that includes a display device that is presenting visual information. This visual information can be identified in the captured images using one or more image processing techniques. After block 414, process 400 flows from block 414 to block 412.

At block 412, the intent of the second vehicle is provided to the driver of the first vehicle. In some embodiments, the driving-intent-determination system includes a display device that displays visual information to the driver, such as via red or green indicators or other graphical information. In other embodiments, the driving intent may be presented to the driver via an audio output device.

After block 412, process 400 terminates or otherwise returns to a calling process to perform other actions. In some embodiments, process 400 may loop (not illustrated) to block 402 to continue to capture images of the area outside the first vehicle, determine the characteristics of the traffic intersection, and obtain the driving intent of a second vehicle. This process may continually analyze images of a traffic intersection when the vehicle approaches or arrives at the traffic intersection.

Although embodiments are described herein with respect to vehicles, embodiments are not so limited. In some other situations, embodiments described herein may be utilized by robots and their interactions with humans. For example, a home improvement store may utilize autonomous robots to travel through the store to track inventory or to provide help to customers. When the autonomous robot approaches an aisle intersection at the same time as a person, the robot can capture images of the person. These images are analyzed to determine if the person is gesturing for the robot to proceed through the aisle intersection while the person waits. Conversely, the robot may determine that it is to wait for the person to proceed through the aisle intersection and may provide a visual or audio indication to tell the person to proceed.

Figure 5:
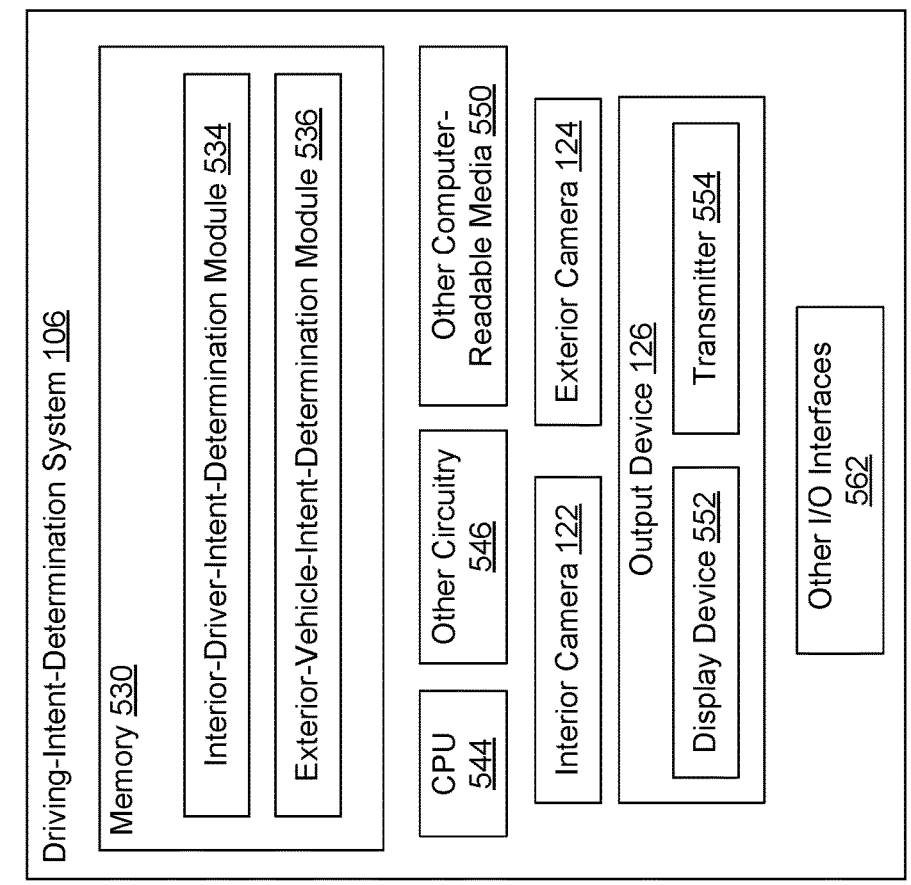
FIG. 5 shows a system diagram that describe various implementations of computing systems for implementing embodiments described herein.

FIG. 5 shows a system diagram that describes one implementation of computing systems for implementing embodiments described herein. System 500 includes driving-intent-determination system 106.

Driving-intent-determination system 106 captures images, determines driving intent of the driver or of other vehicles, and provides the driving intent to other vehicles or to the driver. One or more special-purpose computing systems may be used to implement driving-intent-determination system 106. Accordingly, various embodiments described herein may be implemented in software, hardware, firmware, or in some combination thereof. The driving-intent-determination system 106 may include memory 530, one or more central processing units (CPUs) 544, other circuitry 546, other computer-readable media 550, interior camera 122, exterior camera 124, output device 126, network connections 560, and I/O interfaces 562.

Memory 530 may include one or more various types of non-volatile and/or volatile storage technologies. Examples of memory 530 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 530 may be utilized to store information, including computer-readable instructions that are utilized by CPU 544 to perform actions, including embodiments described herein.

Memory 530 may have stored thereon interior-driver-intent-determination module 534 and exterior-vehicle-intent-determination module 536. The interior-driver-intent-determination module 534 may employ embodiments described herein to obtain images captured by interior camera 122, determine the driver's attention direction and hand movement, determine the driving intent of the driver, and provide the driving intent to other vehicles via output device 126. The interior-driver-intent-determination module 534 may also obtain images from exterior camera 124 to analyze and determine characteristics of a traffic intersection. The exterior-vehicle-intent-determination module 536 may employ embodiments described herein to obtain images captured by exterior camera 124, obtain the intent of other vehicles, and provide the driving intent to the driver via output device 126.

The other circuitry 546 may include application-specific integrated circuits (ASICs), digital signal processors, discrete circuitry, logic gates, standard integrated circuits, controllers (e.g., by executing appropriate computing instructions, and including microcontrollers or embedded controllers), field-programmable gate arrays (FPGAs), complex programmable logic devices (CPLDs), etc., that can employ embodiments described herein.

Other computer-readable media 550 may include other types of stationary or removable computer-readable media, such as removable flash drives, external hard drives, or the like.

Interior camera 122 includes one or more cameras that are configured to capture images of the driver of a vehicle. Exterior camera 124 includes one or more cameras that are configured to capture images of an area outside the vehicle.

Output device 126 includes display device 552 or transmitter 554. The display device 552 includes one or more display devices that are configured to present driving intent information to other vehicles or to a driver. The display device 552 may include one or more LCD screens, LEDs or other lights, or other types of display devices. The transmitter 554 is configured to communicate with other computing devices, including other driving-intent-determination systems, autonomous vehicles, smart vehicles, etc., to provide driving intent information or to receive driving intent information from other vehicles. Other I/O interfaces 562 may include input buttons, audio interfaces, video interfaces, network interfaces, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a first camera that captures first images of a driver of a vehicle;
   a second camera that captures second images of a traffic intersection outside of the vehicle;
   an audio input that captures statements of the driver;
   an accelerometer that captures movement of the vehicle;
   an output device; and
   circuitry configured to:
   capture, via the first camera, one or more first images of the driver of the vehicle at the traffic intersection;
   capture, via the second camera, one or more second images of the traffic intersection;
   capture, via the audio input, a statement of the driver at the traffic intersection;
   identify at least one other vehicle at or approaching the traffic intersection based on an analysis of the one or more second images;
   determine an attention direction of the driver based on an analysis of the one or more first images for head movement and eye position;
   detect hand movement of the driver based on an analysis of the one or more first images;
   determine a gesture intent of the driver based on the hand movement of the driver;
   determine an audio intent of the driver based on the statement of the driver;
   weighting the gesture intent relative to the audio intent of the driver;
   determine, at a first time, a driving intent of the driver based on a combination of the head movement of the driver, the eye position of the driver, the weighted gesture intent, and the weighted audio intent;
   provide, via the output device, information to the at least one other vehicle at the traffic intersection indicating the driving intent;
   obtain, from the accelerometer at a second time, sensor information that is captured after the driving intent is determined;
   determine that the vehicle is moving at the second time based on the sensor information;
   in response to determining that the vehicle is moving at the second time, determine an amount of time between the first time and the second time; and
   in response to the amount of time between the first time and the second time being within the threshold amount time, identify the driver's behavior as aggressive driving.

2. The system of claim 1, wherein the output device includes a display device, and wherein the circuitry provides the information to at least one other vehicle by being further configured to display, via the display device, a visual indicator of the driving intent of the driver.

3. The system of claim 2, wherein the circuitry displays the visual indicator by being further configured to:
   display, via the display device, a first visual signal to indicate that the driver is to proceed through the traffic intersection; or
   display, via the display device, a second visual signal to indicate that the driver is to wait for the at least one other vehicle to proceed through the traffic intersection.

4. The system of claim 1, wherein the output device includes a wireless transmitter, and wherein the circuitry provides the information to at least one other vehicle by being further configured to transmit, via the wireless transmitter, a wireless communication message with the information of the driving intent to the at least one other vehicle.

5. The system of claim 4, wherein the circuitry transmits the wireless communication message by being further configured to:
   send, via the wireless transmitter, the wireless communication message to the at least one other vehicle indicating that the driver of the vehicle intends to wait for the at least one other vehicle to proceed through the traffic intersection; or
   send, via the wireless transmitter, the wireless communication message to the at least one other vehicle indicating that the driver of the vehicle intends to proceed through the traffic intersection.

6. The system of claim 1, wherein the circuitry provides the information to at least one other vehicle by being further configured to:
   provide an indication that the driver is waiting for the at least one other vehicle to proceed through the traffic intersection;
   provide an indication that the driving intent of the driver is unknown; or
   provide an indication that the driver is proceeding through the traffic intersection.

7. The system of claim 1, wherein the circuitry is further configured to:
   identify a make and model of the at least one other vehicle based on an analysis of the one or more second images;
   determine whether the at least one other vehicle is a smart vehicle or a non-smart vehicle based on the make and model of the at least one other vehicle;
   in response to a determination that the at least one other vehicle is a smart vehicle:
   request, from the smart vehicle, a second driving intent of the smart vehicle regarding progression through the traffic intersection;
   in response to a determination that the at least one other vehicle is a non-smart vehicle;
   determine the second driving intent of the non-smart vehicle based on one or more signaling characteristics of the non-smart vehicle; and
   provide, via the output device, second information to driver indicating the second driving intent of the at least one other vehicle.

8. The system of claim 1, wherein the circuitry is further configured to:
   determine one or more characteristics of the traffic intersection based on an analysis of the one or more second images; and
   augment the driving intent based on the one or more characteristics of the traffic intersection.

9. The system of claim 8, wherein the circuitry determines the one or more characteristics of the traffic intersection by being further configured to:
   determine that the traffic intersection is a parking lot based on a positioning of parked cars or parking lines detectable in the one or more second images;

determine that the traffic intersection is a roundabout based on a shape of the traffic intersection or an identity of a roundabout traffic signal detectable in the one or more second images; or determine a number of lanes and their corresponding turning designation and a position of the at least one other vehicle in the lanes.

10. The system of claim 1, wherein the circuitry is further configured to:

determine that the driver has repeated the aggressive driving a select number of times within a second threshold amount of time; and transmit a message to a third party indicating that the driver is driving aggressively.

11. A method, comprising:

capturing one or more images of a driver of a vehicle at a traffic intersection;

determining an attention direction of the driver based on an analysis of the one or more images for head movement and eye position;

detecting hand movement of the driver based on an analysis of the one or more images;

determining a driving intent of the driver based on the head movement, eye position, and hand movement;

obtaining historical data identifying previous actions taken by the driver after previously using the same hand movement;

determining a confidence level associated with the driving intent based on the obtained historical data;

providing information to at least one other vehicle at the traffic intersection indicating the driving intent and the determined confidence level;

obtaining accelerometer data that is captured after the driving intent is determined;

determining that the vehicle is moving within a threshold time after the driving intent is determined based on the accelerometer data; and in response to determining that the vehicle is moving within the threshold time after the driving intent is determined, identifying the driver's behavior as aggressive driving.

12. The method of claim 11, wherein providing the information to at least one other vehicle includes:

displaying a visual indicator of the driving intent.

13. The method of claim 12, wherein displaying the visual indicator includes:

displaying a first visual signal to indicate that the driver is to proceed through the traffic intersection; or displaying a second visual signal to indicate that the driver is to wait for the at least one other vehicle to proceed through the traffic intersection.

14. The method of claim 11, wherein providing the information to at least one other vehicle includes:

transmitting a wireless communication message with the information of the driving intent to the at least one other vehicle.

15. The method of claim 14, wherein transmitting the wireless communication message includes:

sending the wireless communication message to the at least one other vehicle instructing the at least one other vehicle to proceed through the traffic intersection; or sending the wireless communication message to the at least one other vehicle instructing the at least one other vehicle to wait for the driver to proceed through the traffic intersection.

16. The method of claim 11, wherein providing the information to at least one other vehicle includes:

providing an indication that the driver is asking the at least one other vehicle to proceed through the traffic intersection;

providing an indication that the driving intent of the driver is unknown; or providing an indication that the driver is proceeding through the traffic intersection and the at least one other vehicle is to wait.

17. The method of claim 11, further comprising:

capturing at least one second image of the traffic intersection outside of the vehicle;

identifying the at least one other vehicle based on an analysis of the at least one second image;

determining whether the at least one other vehicle is a smart vehicle or a non-smart vehicle;

in response to a determination that the at least one other vehicle is a smart vehicle:

requesting, from the smart vehicle, a second driving intent of the smart vehicle regarding progression through the traffic intersection;

in response to a determination that the at least one other vehicle is a non-smart vehicle:

determining the second driving intent of the non-smart vehicle based on one or more signaling characteristics of the non-smart vehicle; and providing second information to driver indicating the second driving intent of the at least one other vehicle.

18. The method of claim 11, further comprising:

capturing at least one second image of the traffic intersection outside of the vehicle;

determining one or more characteristics of the traffic intersection based on an analysis of the at least one second image; and augmenting the driving intent based on the one or more characteristics of the traffic intersection.

19. The method of claim 18, wherein determining the one or more characteristics of the traffic intersection includes:

determining that the traffic intersection is a parking lot based on a positioning of parked cars or parking lines detectable in the at least one second image;

determining that the traffic intersection is a roundabout based on a shape of the traffic intersection or an identity of a roundabout traffic signal detectable in the at least one second image; or determining a number of lanes and their corresponding turning designation and a position of the at least one other vehicle in the lanes.

20. A non-transitory processor-readable storage medium that stores computer instructions that, when executed by a processor, cause the processor to perform actions, the actions comprising:

capturing, via a first camera, one or more first images of a driver of a vehicle at a traffic intersection;

capturing, via the second camera, one or more second images of the traffic intersection;

identifying at least one other vehicle at or approaching the traffic intersection based on an analysis of the one or more second images;

determining a plurality of physical characteristics of the traffic intersection based on an analysis of the one or more second images or receipt of information from at least one other vehicle, wherein the plurality of physical characteristics of the traffic intersection includes a number of lanes, a number of turn-only lanes, and a position of at least one other vehicle in a lane at the traffic intersection;

detecting hand movement of the driver based on an analysis of the one or more first images;

determining a driving intent of the driver based on the hand movement and the plurality of physical characteristics of the traffic intersection;

providing, via an output device, information to the at least one other vehicle at the traffic intersection indicating the driving intent;

obtaining sensor information that is captured after the driving intent is determined;

determining that the vehicle is moving within a first threshold time of when the driving intent is determined based on the sensor information;

in response to determining that the vehicle is moving within the threshold time, identifying the driver's behavior as aggressive driving;

determining that the driver has repeated the aggressive driving a select number of times within a second threshold time; and in response to determining that the driver has repeated the aggressive driving, transmitting a message to a third party indicating that the driver is driving aggressively.

21. The non-transitory processor-readable storage medium of claim 20, the actions further comprising:

determining whether the at least one other vehicle is a smart vehicle or a non-smart vehicle based on an identity of the at least one other vehicle;

in response to a determination that the at least one other vehicle is a smart vehicle:
   requesting, from the smart vehicle, a second driving intent of the smart vehicle regarding progression through the traffic intersection;

in response to a determination that the at least one other vehicle is a non-smart vehicle;
   determining the second driving intent of the non-smart vehicle based on one or more signaling characteristics of the non-smart vehicle; and providing, via the output device, second information to driver indicating the second driving intent of the at least one other vehicle.

22. The non-transitory processor-readable storage medium of claim 20, wherein determining the driving intent of the driver further comprises:

determining at least one environmental factor associated with the vehicle from at least one of: head movement of the driver, eye position of the driver, ambient noise inside the vehicle, ambient noise outside the vehicle, a level of smoke inside the vehicle, a presence of alcohol smell inside the vehicle, a number passengers inside the vehicle, presence of a cell phone inside the vehicle, headphones being worn by the driver; and determining the driving intent of the driver based on the hand movement and the at least one determined environmental factor.

23. The non-transitory processor-readable storage medium of claim 20, wherein determining the driving intent of the driver further comprises:

capturing, via a microphone, audio of the driver speaking when the vehicle is approaching or at the traffic intersection;

determining at least one spoken word from the driver based on an analysis of the captured audio; and determining the driving intent of the driver based on the hand movement and the at least one determined spoken word.

* * * * *